United States Patent
Masuyoshi et al.

(10) Patent No.: US 8,221,509 B2
(45) Date of Patent: Jul. 17, 2012

(54) BATTERY AND METHOD FOR PRODUCING THE SAME

(75) Inventors: Ryoko Masuyoshi, Ibaraki (JP); Mitsutoshi Watanabe, Suita (JP); Tetsuo Kawai, Takatsuki (JP); Toshiyuki Edamoto, Takatsuki (JP)

(73) Assignee: Hitachi Maxell Energy, Ltd., Otokuni-Gun, Kyoto (JP)

( * ) Notice: Subject to any disclaimer, the term of this patent is extended or adjusted under 35 U.S.C. 154(b) by 227 days.

(21) Appl. No.: 12/468,921

(22) Filed: May 20, 2009

(65) Prior Publication Data
US 2009/0223037 A1 Sep. 10, 2009

Related U.S. Application Data

(62) Division of application No. 10/836,591, filed on Apr. 30, 2004.

(30) Foreign Application Priority Data

| Apr. 30, 2003 | (JP) | 2003-125134 |
| May 9, 2003 | (JP) | 2003-132248 |
| Mar. 16, 2004 | (JP) | 2004-074187 |

(51) Int. Cl.
*H01M 6/00* (2006.01)
*H01M 10/24* (2006.01)
(52) U.S. Cl. ........................ 29/623.1; 429/94
(58) Field of Classification Search .................. None
See application file for complete search history.

(56) References Cited

U.S. PATENT DOCUMENTS

| 5,284,722 | A * | 2/1994 | Sugeno ................ 429/332 |
| 5,439,760 | A | 8/1995 | Howard et al. |
| 6,051,333 | A | 4/2000 | Nagai et al. |
| 6,458,487 | B1 | 10/2002 | Takeuchi et al. |
| 6,599,659 | B1 * | 7/2003 | Endo et al. ............ 429/127 |
| 2002/0018935 | A1 | 2/2002 | Okada |

FOREIGN PATENT DOCUMENTS

| JP | 1-174854 U | 12/1989 |
| JP | 6-6460 Y2 | 2/1994 |
| JP | 6-267583 A | 9/1994 |
| JP | 9-190836 A | 7/1997 |

* cited by examiner

*Primary Examiner* — Robert Hodge
(74) *Attorney, Agent, or Firm* — Birch, Stewart, Kolasch & Birch, LLP (57) ABSTRACT

Sheet-shaped mixture layers are placed on both sides of a current collector to form an electrode (positive electrode) with a layered structure. The electrode with a layered structure and a counter electrode (negative electrode) thereof are wound via a separator, while a positional shift in a winding direction is caused between the current collector and the sheet-shaped mixture layers of the electrode with the layered structure, whereby a winding body is formed. The winding body is placed in a battery case (outer can) to constitute a battery. Particularly, in the electrode with a layered structure, by forming the current collector of a plain-woven wire net, a metal foil, expanded metal, a lath, or punching metal, a battery with satisfactory productivity suitable for an intermediate load can be provided at a low cost.

3 Claims, 5 Drawing Sheets

BATTERY AND METHOD FOR PRODUCING THE SAME

This application is a Divisional of co-pending application Ser. No. 10/836,591, filed on Apr. 30, 2004, the entire contents of which are hereby incorporated by reference and for which priority is claimed under 35 U.S.C. §120; and this application claims priority of Application Nos. 2003-125134, 2003-132248 and 2004-074187 filed in Japan on Apr. 30, 2003, May 9, 2003 and Mar. 16, 2004, respectively, under 35 U.S.C. §119.

BACKGROUND OF THE INVENTION

1. Field of the Invention

The present invention relates to a battery suitable for an intermediate load.

2. Description of the Related Art

As a cylindrical battery, a wound battery for a heavy load such as a camera and a bobbin-type battery having a high capacity for a light load such as a backup have been commercialized. Among them, the bobbin-type battery has a simple configuration and can be produced at a low cost. However, the bobbin-type battery is poor in high rate characteristics due to a small electrode area. Herein, the heavy load refers to discharging, for example, at more than 300 mA, and the light load refers to discharging, for example, at less than 10 mA.

The wound battery for a heavy load is produced, for example, as follows. As a current collector, a foil or a net of a conductor such as metal and carbon, a woven fabric, a non-woven fabric, or the like is used, and the current collector is coated with an active mixture, followed by bonding under pressure. Thus, the current collector is integrated with the active mixture to form a long electrode. The electrode thus produced and a counter electrode are wound via a separator, whereby the wound battery is produced (see JP1(1989)-174854U). However, according to the winding system, a thin long electrode is wound, resulting in a complicated configuration, so that the wound battery is difficult to be produced and involves a high cost.

Furthermore, a lithium-thionyl chloride battery among non-aqueous primary batteries also has a bobbin-type configuration, and also is poor in high rate characteristics. As the recent application of a battery, there is an increasing demand for a current of about several 10 to 300 mA, for example, in information communication and the like. The above-mentioned battery is not suitable for such an intermediate load.

SUMMARY OF THE INVENTION

In one or more embodiments, the present invention provides a battery suitable for an intermediate load, which can be produced at a low cost and has satisfactory productivity.

The present invention relates to a battery including:
an electrode with a layered structure in which sheet-shaped mixture layers are placed on both sides of a current collector;
a counter electrode of the electrode with the layered structure; and
a separator placed between the electrode with the layered structure and the counter electrode,
the electrode with the layered structure, the counter electrode, and the separator being wound in a spiral shape to form a winding body, and the winding body being placed in a battery case.

Furthermore, the present invention relates to a method for producing a battery including: placing sheet-shaped mixture layers on both sides of a current collector to form an electrode with a layered structure;
winding the electrode with the layered structure, a counter electrode of the electrode with the layered structure, and a separator placed between the electrode with the layered structure and the counter electrode, while causing a positional shift in a winding direction between the current collector and the sheet-shaped mixture layers, to form a winding body; and
placing the winding body in a battery case.

Furthermore, the present invention relates to a method for producing a battery including:
placing sheet-shaped mixture layers on both sides of a current collector under a condition that the sheet-shaped mixture layers are not substantially fixed to the current collector, to form an electrode with a layered structure;
winding the electrode with the layered structure, a counter electrode of the electrode with the layered structure, and a separator placed between the electrode with the layered structure and the counter electrode, while causing a positional shift in a winding direction between the current collector and the sheet-shaped mixture layers, to form a winding body; and
placing the winding body in the battery case.

These and other advantages of the present invention will become apparent to those skilled in the art upon reading and understanding the following detailed description with reference to the accompanying figures.

DETAILED DESCRIPTION

In a wound battery, with a long electrode configuration, the number of windings is large, and an electrode necessarily is thin and long. In this case, a winding precision is unlikely to be obtained due to the variation in thickness of the electrode. Furthermore, the ratio at which a current collector, a separator, and the like occupy is increased, leading to an increase in cost, which makes it difficult to supply an inexpensive product. On the other hand, when the electrode is prescribed to be short and thick, the ratio at which the current collector, the separator, and the like occupy is decreased. This enables an active material to be charged in a large amount, increasing a capacity. This also can alleviate a winding shift, which is advantageous in terms of productivity and a cost.

However, in the case of winding a thick electrode, a large stress is applied to the electrode. Therefore, in a conventional electrode in which a current collector and an active mixture are integrated with each other completely, the active mixture peels off or cracks, which is likely to cause the trouble such as a decrease in capacity and a short-circuit.

The inventors of the present invention considered and earnestly studied the above points. Consequently, the following was found. When an electrode with a layered structure, in which previously produced sheet-shaped mixture layers are placed on both sides of a current collector, is wound together with a counter electrode and a separator, by causing a positional shift in a winding direction between the current collector and the sheet-shaped mixture layers of the above-mentioned electrode with a layered structure, the stress applied to the electrode with a layered structure is alleviated remarkably. Even if the mixture layers are prescribed to be thick, inconvenience such as peeling and cracking is not caused, and an inexpensive battery suitable for an intermediate load, which is unlikely to cause a winding defect and a short-circuit, can be produced. Herein, the intermediate load refers to discharging, for example, at about 10 to 300 mA.

The present invention has been achieved based on the above-mentioned finding. More specifically, the present invention relates to a battery containing, in a battery case, a winding body formed by winding an electrode with a layered structure in which sheet-shaped mixture layers are placed on both sides of a current collector substantially without being fixed thereto, a counter electrode of the electrode with the layered structure, and a separator placed between the electrode with the layered structure and the counter electrode in a spiral shape. In particular, the present invention relates to a battery with the above-mentioned configuration in which, in the electrode with the layered structure, the current collector is made of a plain-woven wire net, a metal foil, expanded metal, a lath, or punching metal. Herein, the state where the sheet-shaped mixture layers are not substantially fixed to the current collector refers to the state where the current collector and the sheet-shaped mixture layers do not have a fixed portion at all, or the state where a positional shift may be caused between the current collector and the sheet-shaped mixture layers even in the presence of a fixed portion.

Furthermore, the present invention can provide the following: a battery with the above-mentioned configuration in which the sheet-shaped mixture layers are fixed to the current collector only at an end on a winding center side in the electrode with the above-mentioned layered structure; a battery with the above-mentioned configuration in which an end of the current collector is positioned so as not to be exposed from ends of the sheet-shaped mixture layers; a battery with the above-mentioned configuration in which a width of the current collector is narrower than that of the sheet-shaped mixture layers; a battery with the above-mentioned configuration in which a porosity of the sheet-shaped mixture layers is 35 to 50%; a battery with the above-mentioned configuration in which the sheet-shaped mixture layers respectively have a thickness corresponding to 4 to 10% of an inner diameter of the battery case; a battery with the above-mentioned configuration in which a length of the sheet-shaped mixture layer positioned on an inner side of the current collector before winding is shorter than that of the current collector, and a length of the sheet-shaped mixture layer positioned on an outer side of the current collector before winding is longer than that of the current collector; a battery with the above-mentioned configuration including a winding body in which inner and outer surfaces of the current collector in their entirety are covered with the sheet-shaped mixture layers, and using a non-aqueous electrolyte solution containing lithium perchlorate as a solute; a battery with the above-mentioned configuration in which a number of windings of the winding body exceeds one and does not exceed three; and a battery with the above-mentioned configuration in which the counter electrode is made of metal or a metal alloy; and a battery with the above-mentioned configuration in which the counter electrode is made of lithium or a lithium alloy.

Furthermore, the present invention relates to a method for producing a battery including: placing sheet-shaped mixture layers on both sides of a current collector to form an electrode with a layered structure; winding the electrode with the layered structure, a counter electrode of the electrode with the layered structure, and a separator placed between the electrode with the layered structure and the counter electrode, while causing a positional shift in a winding direction between the current collector and the sheet-shaped mixture layers, to form a winding body; and placing the winding body in a battery case.

Furthermore, as one embodiment of the above-mentioned method for producing a battery, there is provided a method for producing a battery including: placing sheet-shaped mixture layers on both sides of a current collector under a condition that the sheet-shaped mixture layers are not substantially fixed to the current collector, to form an electrode with a layered structure; winding the electrode with the layered structure, a counter electrode of the electrode with the layered structure, and a separator placed between the electrode with the layered structure and the counter electrode, while causing a positional shift in a winding direction between the current collector and the sheet-shaped mixture layers, to form a winding body; and placing the winding body in the battery case.

Thus, according to the present invention, previously produced sheet-shaped mixture layers are placed on both sides of a current collector to form an electrode with a layered structure. This electrode and a counter electrode thereof are wound via a separator in such a manner that a positional shift is caused in a winding direction between the current collector and the sheet-shaped mixture layers of the electrode with the layered structure. Because of this, an inexpensive battery with satisfactory productivity suitable for an intermediate load can be provided, which does not cause any inconvenience such as peeling and cracking even when the mixture layers are prescribed to be thick, and is unlikely to cause a winding defect and a short-circuit.

Hereinafter, the present invention will be described by way of an embodiment of the present invention with reference to the drawings.

Figure 1:
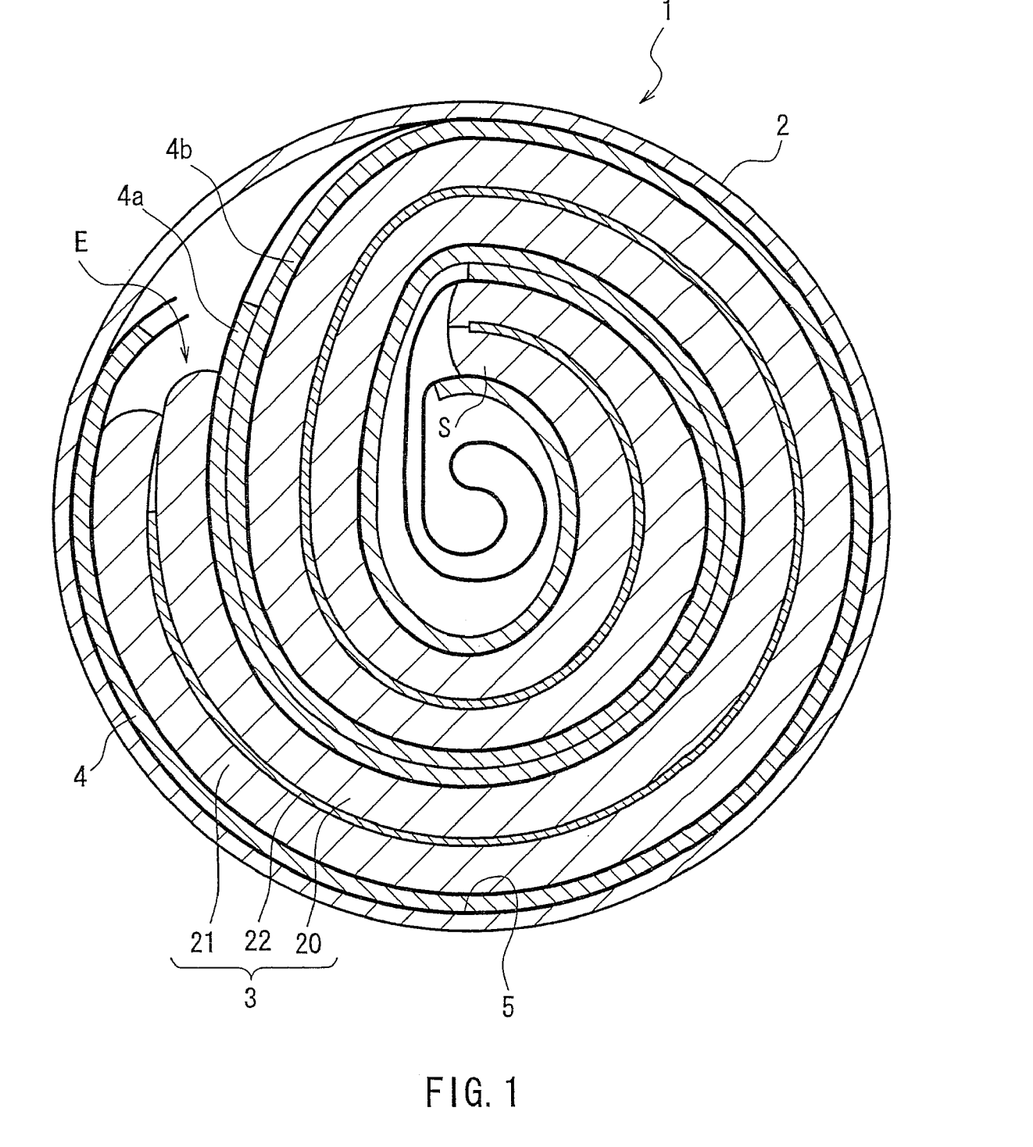
FIG. 1 is a horizontal cross-sectional view of a non-aqueous electrolyte solution battery according to an embodiment of the present invention.
Figure 2:
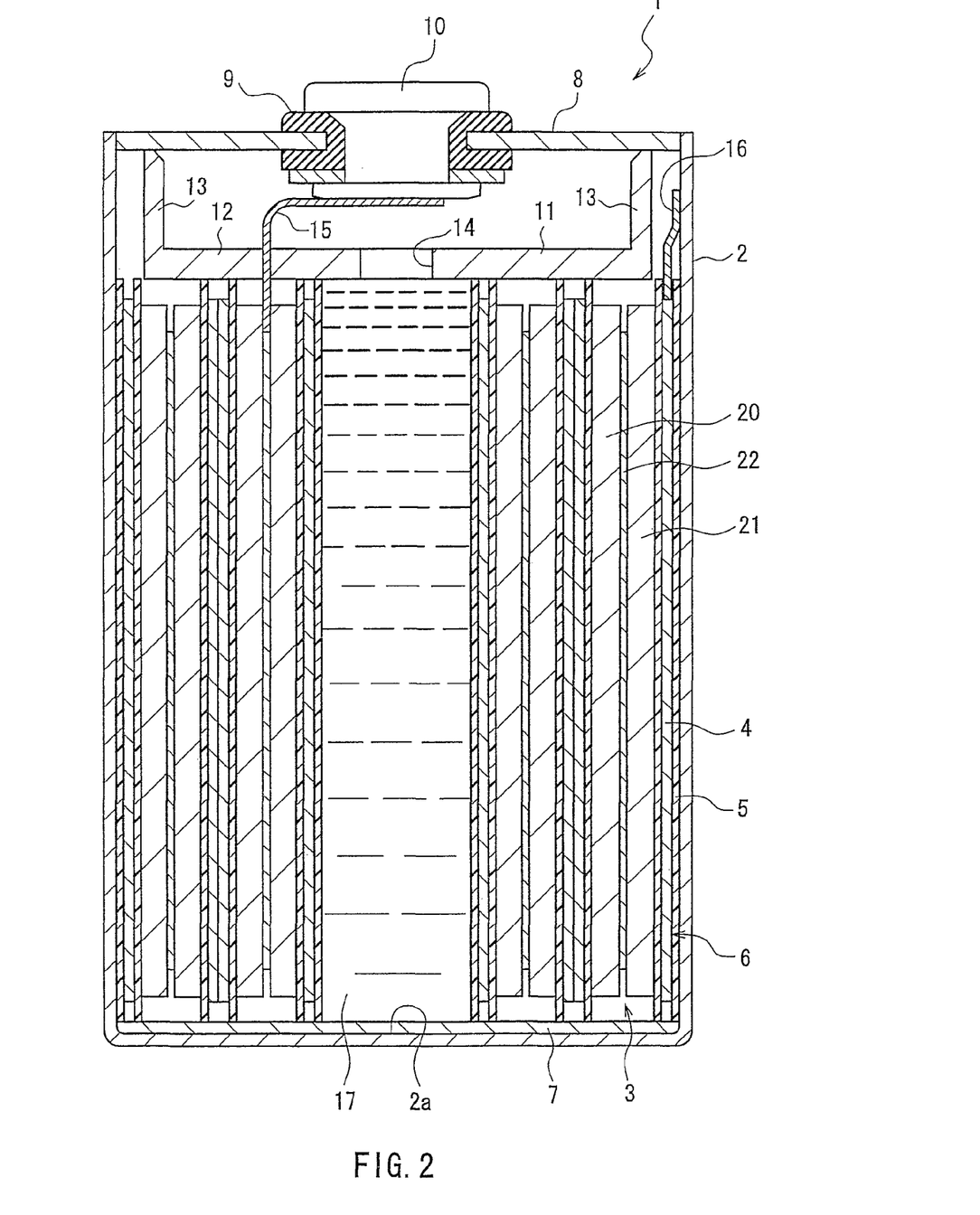
FIG. 2 is a vertical cross-sectional view of the non-aqueous electrolyte solution battery according to the embodiment of the present invention.

FIG. 1 is a horizontal cross-sectional view of a non-aqueous electrolyte solution battery according to the present embodiment. FIG. 2 is a vertical cross-sectional view of a non-aqueous electrolyte solution battery according to the present embodiment. In FIG. 2, a battery 1 includes an outer can 2 that is a battery case, a positive electrode 3 (electrode with a layered structure) and a negative electrode 4 loaded in the outer can 2, and a sealing structure for sealing an upper opening portion of the outer can 2. The positive electrode 3 and the negative electrode 4 are wound via a separator 5 to form a winding body 6, and placed in the outer can 2 together with an electrolyte solution 17.

The above-mentioned sealing structure includes a cover plate 8 fixed to an inner circumference of the upper opening portion of the outer can 2, a terminal 10 mounted on an opening provided at the center of the cover plate 8 via a rubber insulating packing 9, and an insulating plate 11 placed in a lower portion of the cover plate 8. The insulating plate 11 is formed in a round dish shape opening upward with an annular side wall 13 placed on the circumference of a disk-shaped base portion 12, and a gas passage hole 14 is provided at the center of the base portion 12. The cover plate 8 is fixed to the inner circumference of the upper opening portion of the outer can 2 with crimp seal via a laser weld or a packing, under the condition of being received at an upper end portion of the side wall 13. A thin wall portion is provided on the cover plate 8 or a can bottom 2a of the outer can 2, whereby a vent can be provided so as to cope with a rapid increase in internal pressure. On the can bottom 2a, an insulating plate 7 is inserted. The positive electrode 3 and a lower surface of the terminal 10 are connected to each other with a positive lead 15, and the negative electrode 4 and an inner surface of the outer can 2 are connected to each other with a negative lead 16.

In FIG. 1, the positive electrode 3 has a layered structure in which sheet-shaped mixture layers 20, 21 are placed on both sides of a current collector 22, and the positive electrode 3 and the negative electrode 4 that is a counter electrode thereof are wound via a separator 5 to form the winding body 6.

Figure 3:
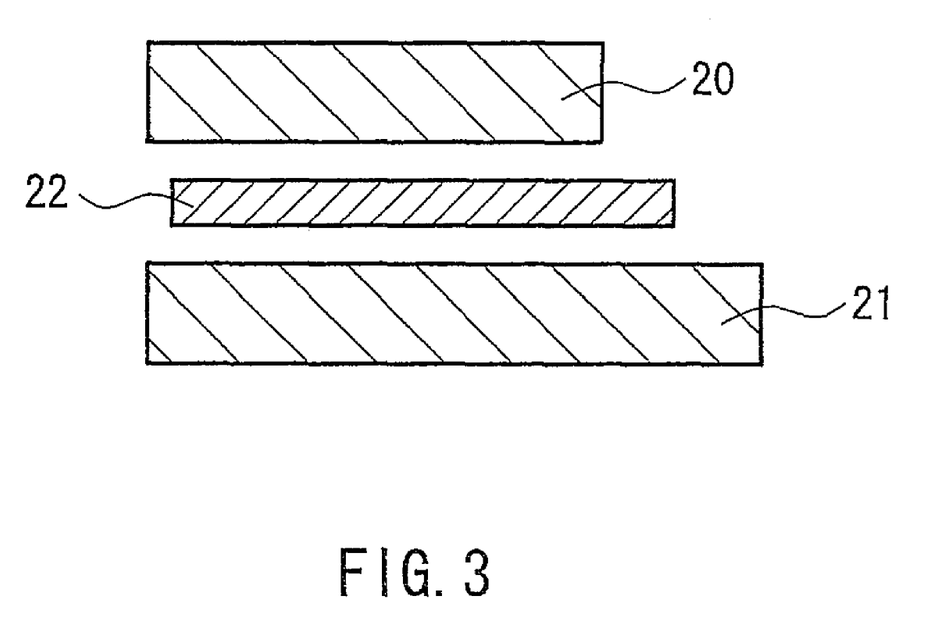
FIG. 3 is a cross-sectional view showing a state of an electrode with a layered structure before winding according to the present embodiment of the present invention.

FIG. 3 is a cross-sectional view showing a state of the above-mentioned electrode (positive electrode) 3 with a layered structure before winding. The sheet-shaped mixture layer 20 positioned on an inner side of the current collector 22 and the sheet-shaped mixture layer 21 positioned on an outer side of the current collector 22 are placed on both sides of the current collector 22 so as not to be fixed thereto. With such a configuration, the flexibility and softness of the positive electrode 3 can be kept satisfactorily. Thus, the active mixture is prevented from coming off, peeling off, or cracking during winding effectively, whereby a short-circuit and a conductive defect can be suppressed exactly.

Figure 4A:
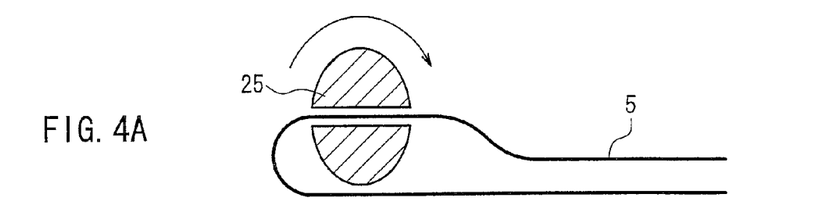
FIGS. 4A, 4B, and 4C illustrate a method for producing a winding body according to the embodiment of the present invention.
Figure 4B:
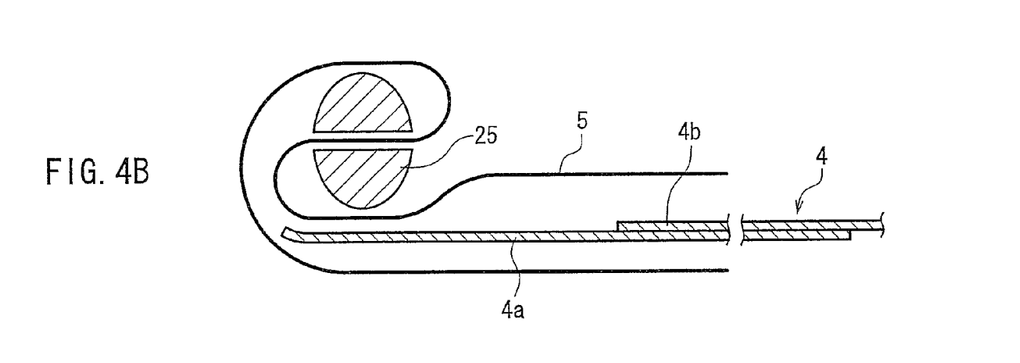
Figure 4C:
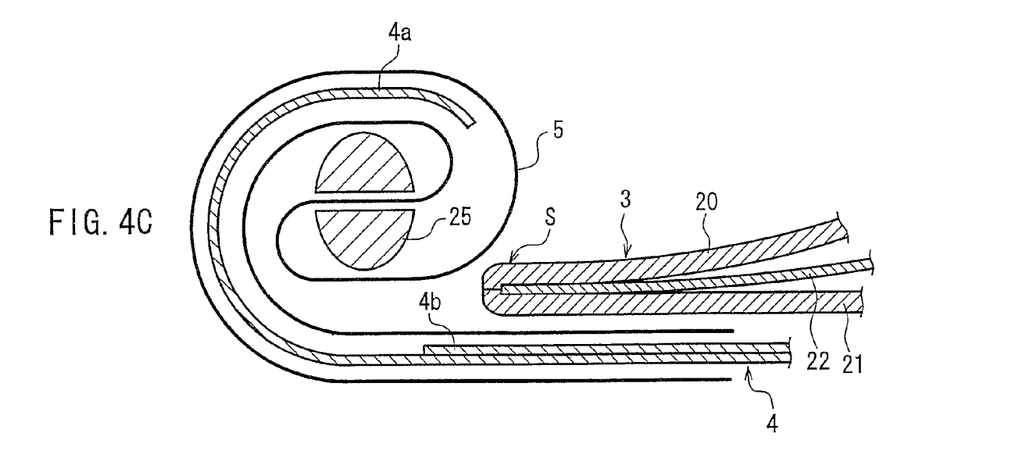

Furthermore, as shown in FIG. 1, in the above-mentioned winding, the sheet-shaped mixture layers 20, 21 may be fixed to the current collector 22 previously at a winding start portion S that is an end of the positive electrode 3 with a layered structure on a winding center side (see FIG. 4C). More specifically, the current collector 22 and the sheet-shaped mixture layers 20, 21 may be layered so that the current collector 22 is placed several mm inside from the sheet-shaped mixture layers 20, 21, and then, a portion of 3 to 10 mm from the end of the layered structure in a longitudinal direction may be bonded by pressing. That is, the current collector 22 and the sheet-shaped mixture layers 20, 21 may be wound under the condition that the sheet-shaped mixture layers 20, 21 merely are in contact with the current collector 22 instead of being fixed thereto. However, by fixing the sheet-shaped mixture layers 20, 21 to the current collector 22 at the winding start portion S, and allowing the sheet-shaped mixture layers 20, 21 to be merely in contact with the current collector 22 in the other portion, instead of fixing the sheet-shaped mixture layers 20, 21 to the current collector 22, setting for winding becomes easy, and a winding shift in a width direction (direction orthogonal to the winding direction) of the electrode can be prevented. Therefore, the winding body 6 can be configured with good precision.

For example, in the case where the current collector 22 is made of a porous current collector such as a net, only ends of the sheet-shaped mixture layers 20, 21 placed on both sides of the current collector 22 are bonded under pressure to the current collector 22, and an active mixture is buried in the net or the like of the current collector 22 with satisfactory adhesion, whereby the sheet-shaped mixture layers 20, 21 can be fixed only to the winding start portion S. A method for fixing at the winding start portion S is not limited to the above, and any arbitrary method can be adopted.

According to the wound configuration around one end of the positive electrode 3 with a layered structure, unlike the conventional winding system in which a current collector is coated with an active mixture, followed by bonding under pressure, whereby the current collector is integrated with the active mixture, and unlike the winding in which the entire positive electrode 3 with a layered structure is fixed as a whole by bonding under pressure, the following advantages are obtained. Even when the sheet-shaped mixture layers 20, 21 provided on both sides of the current collector 22 are prescribed to be very thick, winding can be performed very satisfactorily without any inconvenience such as peeling and cracking of the mixture layers from the current collector 22 during winding, and the problem such as a short-circuit is not caused. Thus, a battery suitable for an intermediate load with satisfactory productivity can be obtained at a low cost.

In the positive electrode 3 with a layered structure, the current collector 22 may be made of a conductor such as metal and carbon. Specific examples of the material for the current collector 22 include a plain-woven wire net, a metal foil, expanded metal, a lath, punching metal, or the like made of Stainless 316 (ISO 683/13 20), Stainless 430 (ISO 683/13 8), Stainless 444 (ISO 683/13 F1), or the like. The current collector 22 preferably has a positional configuration in which both ends thereof are not exposed from ends of the sheet-shaped mixture layers 20, 21, in terms of the prevention of a short-circuit. Furthermore, it is desirable that the width of the current collector 22 is set to be narrower than that of the sheet-shaped mixture layers 20, 21. In this case, the ends of the current collector 22 may be placed 5 mm inside from the ends of the sheet-shaped mixture layers 20, 21 in a width direction.

Furthermore, in the positive electrode 3 with a layered structure, in the case where the current collector 22 is made of a porous current collector such as a net, gaps remain in the current collector 22 in the state of the winding body 6. That is, the porous current collector 22 itself has net-shaped gaps in a state before the sheet-shaped mixture layers 20, 21 are provided. These gaps are formed in a portion of 20 to 90% of the thickness of the current collector 22 from the center in the thickness direction thereof, and in the other portion, the sheet-shaped mixture layers 20, 21 are buried due to the pressure during winding.

It is preferable that the surface of the current collector 22 is coated with a paste-type conductive material. Even in the case of using the net-shaped current collector 22 having a spatial structure, in the same way as in the case of using a material substantially made of a flat plate such as a metal foil, remarkable improvement of the current collecting effect due to coating of the conductive material is recognized. The reason for this is assumed to be the effective utilization of a path where a metal portion of the net-shaped current collector 22 is in direct contact with the sheet-shaped mixture layers 20, 21, and a path via the conductive material filling the net.

Examples of the conductive material include a silver paste, a carbon paste, and the like. Particularly, in the case of the carbon paste, the cost for a material is lower than that of the silver paste, and the contact effect is substantially equal to that of the silver paste. Therefore, in terms of a reduction in production cost of a non-aqueous electrolyte solution battery, the carbon paste is preferable. As a binder for the conductive material, a heat-resistant material such as water glass and an imide-based binder desirably is used. This is because, when moisture in the sheet-shaped mixture layers 20, 21 is removed, drying is performed at a high temperature exceeding 200° C.

The sheet-shaped mixture layers 20, 21 provided on both sides of the current collector 22 generally contain a positive active material, a conductive aid, and a binder. The sheet-shaped mixture layers 20, 21 can be produced by forming the mixture of these materials in a sheet shape with a predetermined thickness by a known coating method or pressing method, or a combination thereof.

Examples of the positive, active material include manganese dioxide, carbon fluoride, a lithium-cobalt complex oxide, a spinel type lithium-manganese complex oxide, and the like. As the conductive aid, at least one selected from graphite, carbon black, acetylene black, Ketchen black, and the like, or a complex of two or more kinds thereof are used. The conductive aid containing Ketchen black as a main component preferably is used. As the binder, a polytetrafluoroethylene dispersion, powdery polytetrafluoroethylene, a rubber binder, and the like are used. The polytetrafluoroethylene dispersion preferably is used.

The porosity of the sheet-shaped mixture layers 20, 21 desirably is 35 to 50%. When the porosity is too small, the mixture density becomes too high. Consequently, the sheet-shaped mixture layers 20, 21 lose flexibility and are likely to crack during winding. On the other hand, when the porosity is too high, the battery capacity is decreased. It also is desirable that the sheet-shaped mixture layers 20, 21 have a thickness corresponding to 4 to 10% of the battery inner diameter as the application to an intermediate load.

When the thickness of the sheet-shaped mixture layers 20, 21 is too small, the number of windings is increased. This causes winding to be cumbersome, resulting in a winding shift, which is likely to cause a short-circuit. On the other hand, when the thickness of the sheet-shaped mixture layers 20, 21 is too large, the pulse discharging characteristics are degraded. Thus, battery characteristics are likely to be lost.

In the case of using the sheet-shaped mixture layers 20, 21 that are relatively thick, and winding them with the negative electrode 4, considering the positional shift in the winding direction caused between the current collector 22 and the sheet-shaped mixture layers 20, 21 during winding, the respective lengths of the sheet-shaped mixture layers 20, 21 generally are determined appropriately as follows: the length of the sheet-shaped mixture layer 20 positioned on an inner side of the current collector 22 before winding is shorter than that of the current collector 22, and the length of the sheet-shaped mixture layer 21 positioned on an outer side of the current collector 22 before winding is longer than that of the current collector 22.

More specifically, as winding proceeds, a portion excluding the vicinity of the winding center of the sheet-shaped mixture layer 20 is shifted outward (in a direction opposite to the winding center) with respect to the current collector 22. On the other hand, a portion excluding the vicinity of the winding center of the sheet-shaped mixture layer 21 is shifted inward (in a direction of the winding center) with respect to the current collector 22. This shift amount is increased with a distance from the winding center. Thus, by appropriately setting the lengths of the sheet-shaped mixture layers 20, 21 and the current collector 22, even when the end of the current collector is exposed between the sheet-shaped mixture layers 20, 21 before winding, as shown in FIG. 3, it can be placed inside the sheet-shaped mixture layers 20, 21 as shown in FIG. 1.

Furthermore, when the inner and outer surfaces of the current collector 22 in their entirety are covered with the sheet-shaped mixture layers 20, 21, whereby the exposure of the current collector 22 to the surface is eliminated, even in the case of using an electrolyte solution with a high conductivity as in an electrolyte solution containing lithium perchlorate as a solute, dendrite-shaped lithium can be suppressed from being deposited on the surface of the current collector 22, and abnormal discharging of a non-aqueous electrolyte solution battery can be prevented.

More specifically, the abnormal discharging of the non-aqueous electrolyte solution battery according to the present invention is caused by a short-circuit of the current collector 22 and the negative electrode 4 via dendrite-shaped lithium deposited on the surface of the current collector 22. Therefore, when the inner and outer surfaces of the current collector 22 in their entirety are covered with the sheet-shaped mixture layers 20, 21, even in the case of using an electrolyte solution with a high conductivity, dendrite-shaped lithium is not deposited on the surface of the current collector 22, and thus, a short-circuit between the current-collector 22 and the negative electrode 4 is suppressed to prevent abnormal heat generation of the battery exactly.

Herein, the phrase "the inner and outer surfaces of the current collector 22 in their entirety are covered with the sheet-shaped mixture layers 20, 21" means not only that the current collector 22 at the winding start portion S and a winding end portion E is covered with the sheet-shaped mixture layers 20, 21 as shown in FIG. 1, but also that the width (length in a vertical direction in FIG. 2) of the current collector 22 is set to be smaller than that of the sheet-shaped mixture layers 20, 21, both ends of the current collector 22 in a width direction are positioned on an inner side from the sheet-shaped mixture layers 20, 21, and covered with the sheet-shaped mixture layers 20, 21.

If the ends of the sheet-shaped mixture layers 20 and 21 at the winding end portion E are designed to extend longer than the end of the current collector 22, the exposure of the current collector 22 at the winding end portion E can be prevented exactly. Thus, the extension size of the sheet-shaped mixture layers 20, 21 with respect to the current collector 22 is set to be in a range of 0.5 mm to 1.5 mm. When the extension size is less than 0.5 mm, the current collector 22 at the winding end portion E may be exposed to the surface. When the extension size exceeds 1.5 mm, the sheet-shaped mixture layers 20, 21 that do not line the current collector 22 become longer, so that the enhancement of a discharging capacity cannot be expected.

As the separator 5, non-woven fabric such as polypropylene, polyethylene, polyethyleneterephthalate, polybutyleneterephthalate, and polyphenylene sulfide, a microporous film, or the like can be used.

The thickness of the separator 5 is not particularly limited. It generally may be 50 to 200 μm in the case of a non-woven fabric, and 10 to 50 μm in the case of a microporous film.

The negative electrode 4 is formed into a thin plate (foil). Examples of the material for the negative electrode 4 include lithium metal, an alloy of lithium and aluminum, a carbon material such as graphite, and the like. The thickness of the negative electrode 4 generally may be set to be in a range of 0.2 to 0.6 mm. The negative electrode 4 is formed by attaching two short and long parts 4a and 4b, as shown in FIGS. 1 and 4B. These negative electrode parts are wound together with the positive electrode 3 and the separator 5 to create a winding body 6. In the negative electrode 4, a current collector such as a copper foil may be used as a base.

The negative electrode 4 and the positive electrode 3 are wound via the separator 5. As shown in FIG. 1, the winding body 6 is formed in a substantially cylindrical shape as a whole by setting the number of windings defined by the winding start portion S and the winding end portion E of the positive electrode 3 to more than 1, 3 or less, and preferably 2 or less, whereby a battery having a capacity suitable for an intermediate load can be produced at a low cost with the winding operation being easy. FIG. 1 shows the embodiment in which the number of windings is about 1.7.

The winding body 6 can be produced in a procedure shown in FIGS. 4A to 4C. First, as shown in FIG. 4A, the separator 5 is sandwiched between two separate parts of a wiring core 25 and wound by one round. Then, as shown in FIG. 4B, one-layer portion of only the short part 4a of the negative electrode 4 is inserted to the winding core 25, and wound by one round together with the separator 5 (see FIG. 4C). As shown in FIG. 4C, the positive electrode 3 is placed on the negative electrode 4 via the separator 5 to be wound around the winding core 25. Herein, the positive electrode 3 is to be wound from the side of the winding start portion S at which the sheet-shaped mixture layers 20, 21 and the current collector 22 are fixed, and wound under the condition of being placed on the long part 4b via the separator 5. After winding, the separator 5 covers an outermost circumference. Finally, the winding end portion E of the separator 5 is fixed with a fixing tape. As described above, the winding body 6 in the form as shown in FIG. 1 can be obtained.

The outer can 2 that is a battery case is composed of a container in the shape of a cylinder with a bottom made of iron or stainless steel, and the cover thereof is sealed with a crimp seal via a laser weld or a packing. Furthermore, sealing may be performed by crimping or glass hermetic sealing of the terminal. Furthermore, in general, a thin wall portion is provided on the cover or the can bottom, whereby a vent is provided so as to cope with the rapid increase in internal pressure.

A non-aqueous electrolyte solution is injected to the outer can 2 that is a battery case. In the non-aqueous electrolyte solution, as a solvent, a mixture is used in which chain ether such as dimethoxyethane is mixed with cyclic carbonate such as propylene carbonate, ethylene carbonate, or the like. As a solute, $LiPF_6$, $LiClO_4$, $LiCF_3SO_3$, $(CF_3SO_2)_2NLi$, or the like is used. As the non-aqueous electrolyte solution, a mixture, in which the above-mentioned solute is dissolved in the above-mentioned solvent in a ratio of 0.3 to 1.5 mol/$dm^3$, is used. Among them, lithium perchlorate ($LiClO_4$) is preferable for obtaining the enhancement effect of battery characteristics due to its high conductivity.

In the case of adopting an electrolyte solution with a high conductivity as in lithium perchlorate, the electrode area defined by the areas of the sheet-shaped mixture layers 20, 21 can be set to be in a range of 25 $cm^2$ to 60 $cm^2$. Such an electrode area is a relatively small value for this type of wound electrode body. However, in the case of adopting an electrolyte solution with a high conductivity as in lithium perchlorate, a satisfactory discharging capacity can be obtained. When the electrode area exceeds 60 $cm^2$, the filling property of an active material is decreased, resulting in a decrease in a light load capacity.

The non-aqueous electrolyte solution battery with the above configuration includes a lithium-manganese dioxide battery, a lithium-carbon fluoride battery, a lithium ion battery, and the like.

The battery of the present invention includes other primary batteries such as a dry battery and an alkaline-manganese battery, and secondary batteries such as a nickel-cadmium battery, a nickel-hydrogen battery, and a lithium ion battery, in addition to the non-aqueous electrolyte solution batteries with the above configuration.

Depending upon the respective battery configurations, a known positive active material (positive mixture), a negative active material (negative mixture), an electrolyte solution, and the like are selected for use appropriately. Furthermore, FIG. 1 shows the example in which the configuration of the present invention is applied to the positive electrode. It also is appreciated that the configuration of the present invention can be applied to the negative electrode in the same way.

Next, the present invention will be described in more detail by way of illustrative examples. It should be noted that the present invention is not limited to these examples. In the examples, the case of a cylindrical lithium-manganese dioxide battery will be described. In the following description, the porosity of the sheet-shaped mixture layer is obtained as follows.

(Measurement of a Porosity)

The absolute specific gravities of manganese dioxide, Ketchen black, and polytetrafluoroethylene constituting a sheet-shaped mixture layer were set to be 4.5 g/$cm^3$, 2.0 g/$cm^3$, and 2.2 g/$cm^3$, respectively. A calculated total weight X (g/$cm^3$) of the respective components contained in the sheet-shaped mixture layer per unit volume was obtained, and a porosity (%) was obtained from the difference between the total weight X (g/$cm^3$) and an actual density Y (g/$cm^3$) of the sheet-shaped mixture layer by an expression $[(X-Y)/X] \times 100$.

Example 1

Production Method of a Positive Electrode (Mixing)

Three parts by weight of Ketchen black and 92 parts by weight of manganese dioxide (produced by Tosoh Corporation) were dry-mixed for 5 minutes, using a planetary mixer. Thereafter, 20 parts by weight of water was added to a dry-mixed solid, followed by mixing for 5 minutes. Then, aqueous dispersion "D-1" (produced by Daikin Industries Ltd.) of polytetrafluoroethylene was added as a binder to the mixture in a weight ratio of 5 parts by weight of the polytetrafluoroethylene, followed by mixing for 5 minutes. The moisture in the resultant mixture was adjusted to be 25 to 30 parts by weight with respect to 100 parts by weight of the solid.

(Formation of a Sheet)

The mixture thus obtained was rolled with two rollers (diameter: 250 mm, temperature: (130±5)° C., press pressure: 7 tons/cm, roller interval: 0.4 mm, rotation speed: 10 rpm) to be formed into a sheet. The mixture (preliminary sheet) having passed through the rollers was dried at (105±5)° C. until the remaining moisture became 1% or less. Then, the dried preliminary sheet was crushed with a crusher. Herein, the pressed preliminary sheet was crushed with a coffee mill until the volume became twice or more the original apparent volume. The diameter of the crushed particles was mostly 1 mm or less, and the fibers of polytetrafluoroethylene added as a binder also were cut to a length of 1 mm or less.

The crushed material was rolled again under the conditions that the roller interval was adjusted to be (0.6±0.05) mm, the roller temperature was (120±10)° C., the press pressure was 7 tons/cm, and the rotation speed was 10 rpm, whereby a sheet-shaped mixture layer was obtained. The sheet-shaped mixture layer had a thickness of 1.0 mm, a density of 2.5 g/$cm^3$, and a porosity of 42%. The thickness (1.0 mm) of the sheet-shaped mixture layer corresponds to 5.9% of the inner diameter of a battery case assembled as described later.

As described above, two sheet-shaped mixture layers 20, 21 (see FIGS. 1 and 4C) for an inner side and an outer side were produced. The sheet-shaped mixture layer 20 for an inner side was cut to a width of 37 mm and a length of 51 mm. The sheet-shaped mixture layer 21 for an outer side was cut into a width of 37 mm and a length of 61 mm. The positive electrode area defined by the sheet-shaped mixture layers 20, 21 was $3.7 \times 5.1 + 3.7 \times 6.1 = 41.44$ $cm^2$.

(Current Collector)

Expanded metal (thickness: 0.2 mm) made of Stainless 316 (ISO 683/13 20) was used as the current collector 22. The expanded metal was cut to a width of 34 mm and a length of 56 mm, and a positive lead 15 made of a stainless ribbon (thickness: 0.3 mm, width: 3 mm) was attached to an end of the expanded metal at the center in a longitudinal direction by resistance welding. The current collector 22 was coated with a carbon paste (produced by Nippon Graphite Industries Ltd.) to such a degree that the lattice of the net was not closed. Thereafter, the resultant current collector 22 was dried for 2 hours or longer under the heating temperature condition of (105±5)° C. Herein, a carbon paste was applied in an amount of 4 mg/cm$^2$.

Next, as shown in FIG. 4C, two sheet-shaped mixture layers 20, 21 and the current collector 22 were integrated under the condition that the current collector 22 was placed between the sheet-shaped mixture layers 20, 21 with only one end of the current collector 22 in a longitudinal direction fixed to the sheet-shaped mixture layers 20, 21, as shown in FIG. 4C. More specifically, each one end of two sheet-shaped mixture layers 20, 21 for an inner and outer sides in a longitudinal direction was aligned, and the end of the current collector 22 is set to be 1 mm inside from the ends of the sheet-shaped mixture layers 20, 21 in the longitudinal direction, so as not to extend off even in a width direction. Under this condition, a portion of 5 mm from the end of the layered structure in the longitudinal direction was bonded by pressing, whereby the sheet-shaped mixture layers 20, 21 and the current collector 22 were integrated. Then, the sheet-shaped mixture layers 20, 21, and the current collector 22 were dried by hot wind at (250±10)° C. for 6 hours to obtain the positive electrode 3. The reason for integrating the sheet-shaped mixture layers 20, 21 and the current collector 22 previously at an end is related to an operation. Therefore, even if the independent sheet-shaped mixture layers 20, 21 and the current collector 22 are integrated during winding at the above-mentioned end, there are no problems in terms characteristics.

(Production Method of a Negative Electrode)

Regarding the negative electrode 4, lithium metal foils (width: 37 mm, thickness: 0.3 mm) were cut to lengths of 46 mm and 96 mm. A portion of 10 mm from one end of the short part 4a was removed, and the remaining portion with a length of 36 mm was bonded to the long part 4b. The negative lead 16 was formed by embossing one end of a nickel ribbon (thickness: 0.1 mm, width: 3 mm). The negative lead 16 was sandwiched between two foils to be fixed thereto by bonding under pressure.

(Assembly Method)

A separator "HIGHPORE" (produced by Asahi Chemical Industry Co., Ltd.) made of a microporous polyethylene film (width: 44 mm, thickness: 0.025 mm) was cut to a length of 220 mm, and wound by one round under the condition of being sandwiched between two parts (diameter: 4 mm) of the winding core 25, as shown in FIG. 4A. Then, as shown in FIGS. 4B and 4C, the negative electrode 4 was wound by one round simultaneously with the separator 5 with one layer portion of the lithium metal foil placed on the winding core 25 side. Then, the positive electrode 3 with the sheet-shaped mixture layers 20, 21 fixed thereto was wound under the condition of being placed on the winding core 25 side. After completion of the winding, the separator 5 covers the outermost circumference, and a winding-up portion of the separator 5 was fixed with a fixing tape. The separator 5 at the winding end portion E was bent so that the separator 5 covers the sheet-shaped mixture layers 20, 21. As described above, the winding body 6 with the number of windings of about 2 was obtained.

Next, an insulating plate 7 made of polypropylene (thickness: 0.2 mm) was inserted onto the bottom of the outer can 2 made of an iron can plated with nickel, and then, the winding body 6 was inserted onto the insulating plate 7 so that the leads 15 and 16 of positive and negative electrodes are directed upward. The negative lead 16 was welded to an upper inner surface of the outer can 2 by resistance welding. The positive lead 15 was welded to a lower surface of the terminal 10 by resistance welding after inserting the insulating plate 11. The insulating resistance at this time was measured, and the absence of a short-circuit was confirmed.

The electrolyte solution was obtained by dissolving $LiClO_4$ in a mixed solvent, in which propylene carbonate and dimethoxy ethane were mixed in a weight ratio of 1:2, in an amount of 0.5 mol/dm$^3$. This electrolyte solution was injected to the outer can 2 in an amount of (3.3±0.1) cm$^3$. The injection of the electrolyte solution was divided by three, and during the final process, the remaining amount was injected under a reduced pressure. After injecting the electrolyte solution, the cover 8 was fitted to seal the outer can 2 by laser welding. Thus, the lithium-manganese dioxide battery according to Example 1 was obtained.

(Post-Processing: Preliminary Discharging, Aging)

The sealed battery was preliminary discharged at a resistance of 1 Ω for 30 seconds, and kept at 45° C. for 24 hours. Thereafter, secondary preliminary discharging was performed at a constant current of 1 A for 3 minutes. The battery after preliminary discharging was aged at room temperature for 7 days.

Example 2

The sheet-shaped mixture layer 20 on an inner side was set to have a thickness of 1.6 mm, a width of 37 mm, and a length of 33 mm. The sheet-shaped mixture layer 21 on an outer side was set to have a length of 1.6 mm, a width of 37 mm, and a length of 43 mm. Expanded metal that was the current collector 22 to be placed between the sheet-shaped mixture layers 20, 21 was set to have a thickness of 0.2 mm, a width of 34 mm, and a length of 37 mm. Thus, the positive electrode 3 was produced. The size of the short part 4a was set to have a thickness of 0.5 mm, a width of 37 mm, and a length of 40 mm, and the size of the long part 4b was set to have a thickness of 0.5 mm, a width of 37 mm, and a length of 80 mm. The separator made of a microporous polyethylene film was set to have a width of 44 mm, a thickness of 0.025 mm, and a length of 150 mm. A lithium-manganese dioxide battery according to Embodiment 2 was obtained in the same way as in Example 1, except for the above-mentioned conditions. The number of windings of the winding body 6 was about 1.5, and the thickness (1.6 mm) of the sheet-shaped mixture layer corresponded to 9.4% of the inner diameter of an assembled battery case. The area of the positive electrode defined by the sheet-shaped mixture layers 20, 21 was 3.7×3.3+3.7×4.3=28.12 cm$^2$.

Example 3

The sheet-shaped mixture layer 20 on an inner side was set to have a thickness of 0.7 mm, a width of 37 mm, and a length of 73 mm. The sheet-shaped mixture layer 21 on an outer side was set to have a thickness of 0.7 mm, a width of 37 mm, and a length of 83 mm. Expanded metal that was the current collector 22 to be placed between the sheet-shaped mixture layers 20, 21 was set to have a thickness of 0.2 mm, a width of 34 mm, and a length of 78 mm. Thus, the positive electrode 3 was produced. The size of the short part 4a was set to have a thickness of 0.2 mm, a width of 37 mm, and a length of 60 mm, and the size of the long part 4b was set to have a thickness of 0.2 mm, a width of 37 mm, and a length of 110 mm. The separator made of a microporous polyethylene film was set to have a width of 44 mm, a thickness of 0.025 mm, and a length of 300 mm. A lithium-manganese dioxide battery according to Embodiment 3 was obtained in the same way as in Example 1, except for the above-mentioned conditions. The number of windings of the winding body 6 was about 3, and the thickness (0.7 mm) of the sheet-shaped mixture layer corresponded to 4.1% of the inner diameter of an assembled battery case. The area of the positive electrode defined by the sheet-shaped mixture layers 20, 21 was $3.7 \times 7.3 + 3.7 \times 8.3 = 57.72$ cm$^2$.

Example 4

The positive electrode 3 was produced in the same way as in Example 1, except that the density of the sheet-shaped mixture layers 20, 21 was changed to 2.8 g/cm$^3$, and the porosity thereof was changed to 35%. Furthermore, a lithium-manganese dioxide battery was produced in the same way as in Example 1, using the positive electrode 3 thus obtained.

Example 5

The positive electrode 3 was produced in the same way as in Example 1, except that the density of the sheet-shaped mixture layers 20, 21 was changed to 2.16 g/cm$^3$, and the porosity thereof was changed to 50%. Furthermore, a lithium-manganese dioxide battery was produced in the same way as in Example 1, using the positive electrode 3 thus obtained.

Example 6

The positive electrode 3 was produced in the same way as in Example 1, except that a plain-woven wire net made of Stainless 316 (ISO 683/13 20) (thickness: 0.2 mm, width: 34 mm, length: 56 mm) was used as the current collector 22. Furthermore, a lithium-manganese dioxide battery was produced in the same way as in Example 1, using the positive electrode 3 thus obtained.

Example 7

The positive electrode 3 was produced in the same way as in Example 1, except that the density of the sheet-shaped mixture layers 20, 21 was changed to 3.0 g/cm$^3$ and the porosity thereof was changed to 30%. Furthermore, a lithium-manganese dioxide battery was produced in the same way as in Example 1, using the positive electrode 3 thus obtained.

Example 8

A lithium-manganese dioxide battery was produced in the same way as in Example 1, except for using an electrolyte solution in which LiCF$_3$SO$_3$ was dissolved in an amount of 0.5 mol/dm$^3$ in a mixed solvent containing propylene carbonate and dimethoxyethane in a weight ratio of 1:2.

Example 9

The positive electrode 3 was produced in the same way as in Example 3, except that the width of the current collector 22 was set to be the same (37 mm) as that of the sheet-shaped mixture layers 20, 21. Furthermore, a lithium-manganese dioxide battery was produced in the same way as in Example 1, using the positive electrode 3 thus obtained. In this case, upper and lower ends of the current collector 22 were aligned with end faces of the sheet-shaped mixture layers 20, 21, and upper and lower ends of the current collector 22 were not covered with the sheet-shaped mixture layers 20, 21 and seen from outside.

Comparative Example 1

The positive electrode 3 was produced in the same way as in Example 1, except that the lengths of the sheet-shaped mixture layers 20, 21 and the current collector 22 were changed to 56 mm, and the entire electrode was bonded by pressing. Furthermore, winding was performed in the same way as in Example 1, using the positive electrode 3 thus obtained. The mixture layers 20, 21 peeled off, so that it was not possible to produce a winding body. Thus, it was not possible to produce a battery.

Comparative Example 2

The positive electrode 3 was produced in the same way as in Example 1, except that the sheet-shaped mixture layer 20 on an inner side was set to have a thickness of 0.28 mm, a width of 37 mm, and a length of 150 mm, the sheet-shaped mixture layer 21 on an outer side was set to have a thickness of 0.28 mm, a width of 37 mm, and a length of 150 mm, expanded metal that was the current collector 22 to be placed between the sheet-shaped mixture layers 20, 21 was set to have a thickness of 0.2 mm, a width of 34 mm, and a length of 148 mm, and the entire electrode was bonded by pressing in the same way as in Comparative Example 1. The size of the short part 4a was set to have a thickness of 0.1 mm, a width of 37 mm, and a length of 134 mm, and the size of the long part 4b was set to have a thickness of 0.1 mm, a width of 37 mm, and a length of 184 mm. The separator made of a microporous polyethylene film was set to have a width of 44 mm, a thickness of 0.025 mm, and a length of 600 mm. The area of the positive electrode defined by the sheet-shaped mixture layers 20, 21 was $3.7 \times 15.0 + 3.7 \times 15.0 = 111.0$ cm$^2$. The number of windings of the winding body 6 was about 6, and the thickness (0.28 mm) of the sheet-shaped mixture layer corresponded to 1.6% of the inner diameter of an assembled battery case.

Comparative Example 3

A bobbin-type lithium-manganese dioxide battery was produced by forming a positive mixture in a hollow cylindrical shape (outer diameter: 17 mm, inner diameter: 11 mm, height: 37 mm), and placing lithium metal (thickness: 1 mm) as a negative electrode on an inner circumferential surface of the positive mixture via a separator. The same positive mixture and separator as those in Example 1 were used, and an outer circumferential surface and a bottom surface of lithium metal were covered with the separator. In this case, the electrode area where the positive electrode and the negative electrode were opposed to each other was about 13 cm$^2$.

Prior to the evaluation of the characteristics of the lithium-manganese dioxide batteries of Examples 1 to 9 and Comparative Examples 1 to 3, the following test was performed.

Figure 5A:
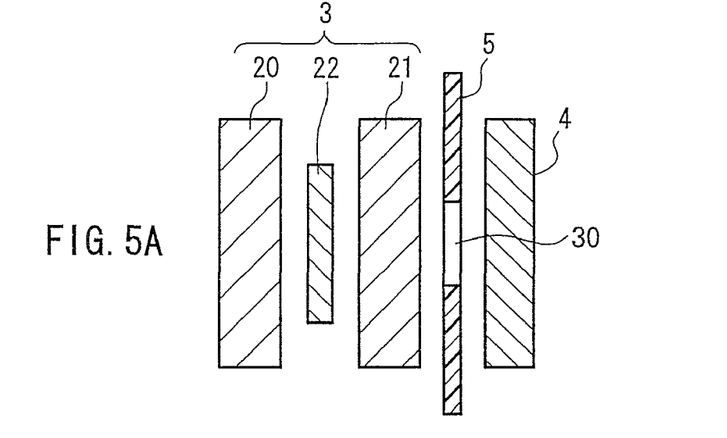
FIGS. 5A, 5B, and 5C show a state of positive and negative electrodes of the winding body according to a test model to be checked for safety in each overdischarging state.
Figure 5B:
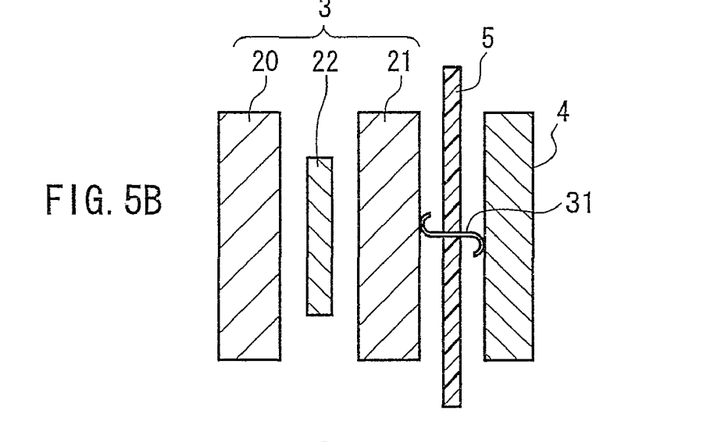
Figure 5C:
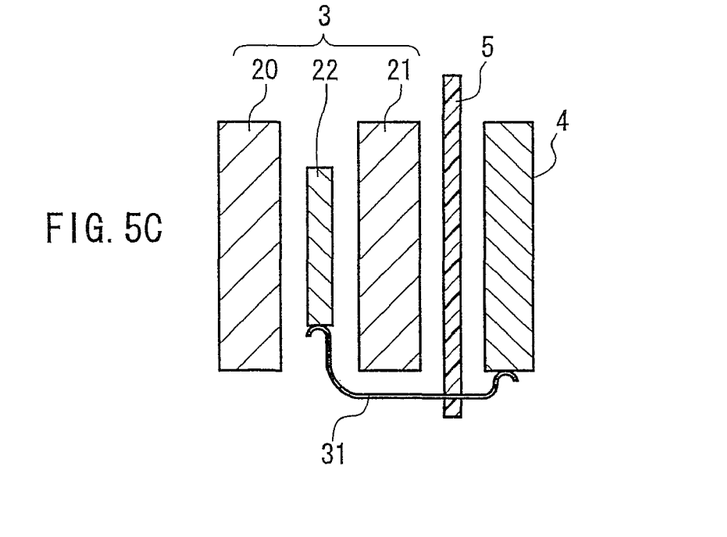

In the winding body 6 according to Example 1, the positive electrode 3 and the negative electrode 4 were short-circuited as shown in FIGS. 5A to 5C. More specifically, three kinds of winding bodies 6 were prepared as follows. As shown in FIG. 5A, a hole 30 of 0.25 cm$^2$ was opened directly in the separator 5 so that the surface of the sheet-shaped mixture layer 21 came into contact with the negative electrode 4. As shown in FIG. 5B, a short-circuit path was provided between the surface of the sheet-shaped mixture layer 21 and the negative electrode 4, using a stainless wire 31 (diameter: 0.065 mm). As shown in FIG. 5C, a short-circuit path was provided between the current collector 22 of the positive electrode 3 and the negative electrode 4, using a stainless wire 31 (diameter: 0.065 mm). The respective winding bodies 6 were loaded in the outer can 2, whereby three non-aqueous electrolyte solution batteries: a model (a) corresponding to FIG. 5A, a model (b) corresponding to FIG. 5B, and a model (c) corresponding to FIG. 5C were produced.

The same electrolyte solution as that used in Example 1 was injected to three-kinds of lithium-manganese dioxide batteries of the models (a) to (c), and an increase in temperature at that time was measured. Table 1 shows the results.

TABLE 1

|  | Highest temperature | State of separator |
|---|---|---|
| Model (a) | 70° C. | Normal |
| Model (b) | 40° C. | Normal |
| Model (c) | 112° C. | Stainless wire destroyed, and separator damaged |

As shown in Table 1, the temperature increased rapidly to exceed 110° C. only in the case of the Model (c). The batteries were disassembled after the test. No abnormality was found in the separator 5 and the like in the batteries of the models (a) and (b), whereas the stainless wire 31 used for a short-circuit path was destroyed, and a black burned portion was found on the separator 5 in the vicinity of the stainless wire 31 in the battery of the model (c).

It is understood from the above results that abnormal heat generation occurred only in the case where a short-circuit path was formed between the current collector 22 of the positive electrode 3 and the negative electrode 4 as a short-circuit site inside the battery. Considering this, the safety during overdischarging was determined based on the presence/absence of deposition of lithium on the current collector 22 of the positive electrode 3.

After completely discharging the batteries of Examples 1, 8 and 9, the voltage between terminals of the batteries was forcefully discharged to −3 V for one hour, and then, the deposition of lithium on the current collector 22 was observed. Table 2 shows the results.

TABLE 2

|  | Deposition site of lithium |
|---|---|
| Example 1 | Only a positive electrode surface |
| Example 8 | Only a positive electrode surface |
| Example 9 | End surface of a current collector |

As shown in Table 2, in the battery of Example 1 in which the current collector 22 was not exposed, and LiClO$_4$ was adopted as an electrolyte solution with a high conductivity, and in the battery of Example 8 in which the current collector 22 was not exposed, and LiCF$_3$SO$_3$ was adopted as an electrolyte solution, the direct deposition of lithium on the current collector 22 was not found. In contrast, in the battery of Example 9 in which the current collector 22 was exposed at upper and lower ends of the winding body 6, and an electrolyte solution with a high conductivity was adopted, the deposition of lithium on the current collector 22 was found. Thus, the following was confirmed: if the inner and outer surfaces of the current collector 22 in their entirety are covered with the sheet-shaped mixture layers 20, 21, even in the case of adopting an electrolyte solution with a high conductivity such as that containing lithium perchlorate as a solute, the deposition of dendrite-shaped lithium during overdischarging can be suppressed exactly.

Next, Table 3 shows the results obtained by discharging the batteries of Examples 1 and 8 at a load of 300 mA, and measuring the discharging capacity until the voltage of the batteries reached 2.0 V.

TABLE 3

|  | Solute of an electrolyte solution | Discharging capacity at 300 mA |
|---|---|---|
| Example 1 | LiClO$_4$ | 1210 mAh |
| Example 8 | LiCF$_3$SO$_3$ | 824 mAh |

As shown in Table 3, in the battery of Example 8 using LiCF$_3$SO$_3$ as a solute of an electrolyte solution, the conductivity of the electrolyte solution was lower than that of the battery of Example 1 using LiClO$_4$ as a solute of an electrolyte solution, so that a discharging capacity was decreased.

Respective one hundred lithium-manganese dioxide batteries of Examples 1-9 and Comparative Examples 1-3 were checked for a defect ratio and a short-circuit occurrence ratio during assembly of the batteries. Furthermore, each of the lithium-manganese dioxide batteries was discharged to 2.0 V at 20° C. and 5 mA to measure each discharging capacity, and the characteristics at a low load were checked. Furthermore, other respective one hundred lithium-manganese dioxide batteries of Examples 1-9 and Comparative Examples 1-3 were discharged to 2.0 V at 100 mA to measure each discharging capacity, and the characteristics at an intermediate load were checked. Table 4 shows the results. The defect ratio during assembly in Table 4 refers to the ratio of batteries in which the defects such as peeling and cracking of the mixture layers during winding occurred among one hundred assembled batteries. Furthermore, the short-circuit occurrence ratio refers to the ratio of the batteries in which a short-circuit occurred among one hundred assembled batteries.

TABLE 4

|  | Defect ratio during assembly (%) | Short-circuit occurrence ratio (%) | Discharging capacity (mAh) | |
|---|---|---|---|---|
|  |  |  | Discharging at 5 mA | Discharging at 100 mA |
| Example 1 | 0 | 0 | 2400 | 1650 |
| Example 2 | 0 | 0 | 2460 | 1520 |
| Example 3 | 0 | 0 | 2340 | 1700 |
| Example 4 | 0 | 0 | 2600 | 1680 |
| Example 5 | 0 | 0 | 2100 | 1530 |
| Example 6 | 0 | 0 | 2400 | 1680 |
| Example 7 | 5 | 0 | 2750 | 1590 |
| Example 8 | 0 | 0 | 2400 | 1600 |
| Example 9 | 0 | 5 | 2400 | 1680 |
| Comparative Example 1 | 100 | — | — | — |
| Comparative Example 2 | 0 | 10 | 1950 | 1800 |
| Comparative Example 3 | 0 | 0 | 2800 | 150 |

As is apparent from the results shown in Table 4, in Example 1, there were no trouble and short-circuit during assembly. In Example 2, even in the case of using relatively thick sheet-shaped mixture layers, a satisfactory battery was obtained without cracking and a short-circuit. In Example 3, although the capacity was decreased to some degree due to the long electrode, the characteristics at an intermediate load were enhanced. In Examples 4 and 5, by setting the porosity of the sheet-shaped mixture layers to be 35 to 50%, there were no degradation in characteristics at an intermediate load, and no cracking and short-circuit during winding. In Example 6, even when the current collector was changed, the same satisfactory results as the above were obtained. In Example 7, the porosity of the sheet-shaped mixture layers was lower than a preferable range; therefore, although the discharging capacity at 5 mA was increased compared with Example 1, winding became slightly difficult, and the occurrence of slight defects were recognized during assembly. In Example 8, since $LiCF_3SO_3$ was used as a solute of an electrolyte solution, the discharging capacity at 100 mA was decreased slightly, compared with the battery of Example 1 using $LiClO_4$ as a solute of an electrolyte solution. In Example 9, since the width of the current collector was the same as that of the sheet-shaped mixture layers, and the ends of some current collectors were exposed largely to the ends of the sheet-shaped mixture layers due to the variation in winding, the occurrence of a slight short-circuit was recognized.

In contrast, in Comparative Example 1 in which the sheet-shaped mixture layers with the same thickness as that in Example 1 were fixed completely to the current collector, it was not possible to produce a winding body as described above. Furthermore, in Comparative Example 2 similar to the conventional wound battery using a long positive electrode in which thin sheet-shaped mixture layers were integrated with a current collector, a reaction area was large. Therefore, although the discharging capacity was less decreased at an intermediate load, the filling amount of an active material was limited, resulting in a small discharging capacity at a low load. Furthermore, due to the long positive electrode, a winding shift was likely to occur in a width direction during winding, and the occurrence of a short-circuit was recognized. Furthermore, in Comparative Example 3 having a bobbin-type configuration, although the capacity of the battery itself was large, the capacity was decreased remarkably at an intermediate load. Thus, the battery was used only at a low load.

Thus, in Examples 1 to 9 according to the present invention, wound batteries were configured, which had a capacity larger than that of the conventional wound battery of Comparative Example 2, and was more suitable for an intermediate load than that of the bobbin-type battery of Comparative Example 3. Furthermore, in the batteries of Examples 1 to 8 in which the end of the current collector was prevented from being exposed from the ends of the sheet-shaped mixture layers, the occurrence of a short-circuit was not recognized.

In the batteries of Examples 1 to 6, and 8 in which the porosity of the mixture layers was set to be 35 to 50%, the occurrence of defects such as peeling and cracking of the mixture layers during winding were not recognized. Furthermore, in Example 1 using lithium perchlorate in an electrolyte solution, the characteristics at an intermediate load were enhanced compared with those of Example 8 using no lithium perchlorate. As is apparent from the above, according to the present invention, a battery with a large capacity suitable for an intermediate load can be assembled easily.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for producing a battery, comprising:
    disposing sheet-shaped mixture layers on both sides of a current collector to form an electrode with a layered structure;
    fixing the sheet-shaped mixture layers to the current collector only at a winding start portion that includes an end edge located on a winding center side of the current collector:
    winding the electrode with the layered structure, a counter electrode of the electrode with the layered structure, and a separator disposed between the electrode with the layered structure and the counter electrode, while causing a positional shift in a winding direction between the current collector and the sheet-shaped mixture layers, to form a winding body; and
    placing the winding body in-an outer can.

2. The method for producing a battery according to claim 1, comprising disposing a sheet-shaped mixture layer shorter than the current collector and a sheet-shaped mixture layer longer than the current collector respectively on both sides of the current collector, to form the electrode with the layered structure.

3. The method for producing a battery according to claim 1, wherein a number of windings of the winding body exceeds one and does not exceed three.

* * * * *